US012672187B2

(12) United States Patent
Koskinen et al.

(10) Patent No.: US 12,672,187 B2
(45) Date of Patent: Jun. 30, 2026

(54) FAST ACTIVATION OF A SECONDARY CELL GROUP

(71) Applicant: Nokia Technologies Oy, Espoo (FI)

(72) Inventors: Henri Markus Koskinen, Espoo (FI); Samuli Heikki Turtinen, Ii (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 420 days.

(21) Appl. No.: 18/262,850

(22) PCT Filed: Dec. 16, 2021

(86) PCT No.: PCT/EP2021/086122
§ 371 (c)(1),
(2) Date: Jul. 25, 2023

(87) PCT Pub. No.: WO2022/161698
PCT Pub. Date: Aug. 4, 2022

(65) Prior Publication Data
US 2024/0090060 A1    Mar. 14, 2024

(30) Foreign Application Priority Data

Jan. 29, 2021    (FI) ..................................... 20215102

(51) Int. Cl.
*H04W 76/16* (2018.01)
(52) U.S. Cl.
CPC .................................... *H04W 76/16* (2018.02)
(58) Field of Classification Search
CPC .............................. H04W 76/16; H04W 76/15
See application file for complete search history.

(56) References Cited

U.S. PATENT DOCUMENTS

| | | | | |
|---|---|---|---|---|
| 12,328,781 B2 * | 6/2025 | Yilmaz | ................. | H04W 76/19 |
| 2015/0215965 A1 * | 7/2015 | Yamada | ................. | H04W 76/27 |
| | | | | 370/329 |
| 2021/0051767 A1 * | 2/2021 | Zhang | .................... | H04W 76/16 |
| 2021/0337612 A1 * | 10/2021 | Yang | ...................... | H04W 76/30 |
| 2022/0141904 A1 * | 5/2022 | Yilmaz | ................. | H04W 76/27 |
| | | | | 370/329 |
| 2022/0225453 A1 * | 7/2022 | Kim | ...................... | H04W 76/20 |

(Continued)

*Primary Examiner* — Will W Lin

(74) *Attorney, Agent, or Firm* — Carter, DeLuca & Farrell LLP

(57) ABSTRACT

There are provided apparatuses, methods and computer program products. In accordance with an embodiment, there is disclosed a method comprising activating a secondary cell group provided by a secondary node co-operating with a master node for providing dual-connectivity communication resources for a user equipment. The activation is initiated either by the secondary node or the master node. Wherein when the activation is initiated by the secondary node a request is formed to activate the secondary cell group and the request is sent on a data radio bearer to the master node to be delivered to the user equipment for activation of the secondary cell group; and an activation indication is received from the user equipment. Wherein when the activation is initiated by the master node at least one message is received from the user equipment or from the master node; and initiation of the activation of the secondary cell group provided by the secondary node is determined based on the received at least one message.

14 Claims, 7 Drawing Sheets

(56) References Cited

U.S. PATENT DOCUMENTS

| | | | |
|---|---|---|---|
| 2022/0256368 A1* | 8/2022 | Futaki ................... | H04W 24/04 |
| 2022/0264486 A1* | 8/2022 | Hu ........................ | H04L 1/0038 |
| 2023/0109276 A1* | 4/2023 | Wu ....................... | H04W 76/20 |
| | | | 370/329 |
| 2023/0363026 A1* | 11/2023 | Futaki ................... | H04W 76/15 |
| 2023/0422309 A1* | 12/2023 | Qiu ..................... | H04W 74/006 |
| 2024/0172306 A1* | 5/2024 | Wallentin .......... | H04W 28/0278 |

* cited by examiner

S-GW

S1-U

S1-U

MME

S1-MME

X2-C

X2-U

En-gNB
(Secondary)

MeNB
(Master)

UE

C-Plane: Signalling Message

U-Plane: Data

FAST ACTIVATION OF A SECONDARY CELL GROUP

TECHNICAL FIELD

The present disclosure relates to a method and apparatus for signaling framework for fast activation of a secondary cell group.

BACKGROUND

This section is intended to provide a background or context to the disclosure that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

5G-NR (5$^{th}$ generation New Radio) is a new radio access technology which has been developed by the 3$^{rd}$ generation partnership project (3GPP) for the 5$^{th}$ generation mobile networks. 5G-NR has been specified within 3GPP to be able to coexist with 4G-LTE (Long Term Evolution) within the same spectrum. 5G supports multi-radio dual connectivity (MR-DC) configurations, where a multiple Rx/Tx capable user equipment (UE) may be configured to utilize resources provided by two different nodes connected via a non-ideal backhaul. One of the nodes provides NR access and the other one provides either E-UTRA (Evolved Universal Terrestrial Radio Access) or NR (New Radio) access. One node acts as a master node (MN) and the other acts as a secondary node (SN). The master node and the secondary node are connected via a network interface and at least the master node is connected to a core network. In this kind of dual connectivity mode, UE may be simultaneously connected both to the LTE and the NR or to the LTE for control plane and the NR for user plane. In this dual connectivity feature, UE may simultaneously leverage benefits of both the LTE and the 5G connectivity.

When UE data rate requirement changes dynamically, e.g. from high to low, the secondary node is worth considering whether it could be (de)activated to save network and UE energy consumption. Before changing the activation state of the UE's SCG, the dual-connectivity Master Node (MN) and Secondary Node (SN) have been assumed to perform a signaling handshake. This introduces delay which may be harmful especially for activation. Therefore, there is a need to find a solution which at least aims to reduce the delay.

SUMMARY

Some embodiments provide a method and apparatus for fast activation of a secondary cell group. In this context the fast activation means inter alia an activation procedure in which time the activation may take is aimed to be reduced by omitting at least some of mutual message exchange between a dual-connectivity master node and a secondary node when a secondary cell group will be activated for a user equipment.

According to a first aspect there is provided an apparatus comprising:

means for activating a secondary cell group provided by a secondary node co-operating with a master node for providing dual-connectivity communication resources for a user equipment, wherein the activation is initiated either by the secondary node or the master node;

wherein when the activation is initiated by the secondary node, the apparatus comprising:

means for forming a request to activate the secondary cell group;

means for sending the request on a data radio bearer to the master node to be delivered to the user equipment for activation of the secondary cell group; and means for receiving from the user equipment an activation indication; and wherein when the activation is initiated by the master node, the apparatus comprising:

means for receiving at least one message from the user equipment or from the master node;

means for determining initiation of the activation of the secondary cell group provided by the secondary node based on the received at least one message.

According to a second aspect there is provided a method comprising:

activating a secondary cell group provided by a secondary node co-operating with a master node for providing dual-connectivity communication resources for a user equipment, wherein the activation is initiated either by the secondary node or the master node, wherein when the activation is initiated by the secondary node, forming a request to activate the secondary cell group;

sending the request on a data radio bearer to the master node to be delivered to the user equipment for activation of the secondary cell group; and receiving from the user equipment an activation indication; and wherein when the activation is initiated by the master node, receiving at least one message from the user equipment or from the master node; and determining initiation of the activation of the secondary cell group provided by the secondary node based on the received at least one message.

According to a third aspect there is provided an apparatus comprising at least one processor; and at least one memory including computer program code the at least one memory and the computer program code configured to, with the at least one processor, cause the apparatus to perform at least the following:

activating a secondary cell group provided by a secondary node co-operating with a master node for providing dual-connectivity communication resources for a user equipment, wherein the activation is either the secondary node initiated or the master node initiated, wherein when the activation is initiated by the secondary node, forming a request to activate the secondary cell group;

sending the request on a data radio bearer to the master node to be delivered to the user equipment for activation of the secondary cell group; and receiving from the user equipment an activation indication; and wherein when the activation is initiated by the master node, receiving at least one message from the user equipment or from the master node; and determining initiation of the activation of the secondary cell group provided by the secondary node based on the received at least one message.

According to a fourth aspect there is provided a computer program comprising computer readable program code which, when executed by at least one processor; cause an apparatus to perform at least the following:

activating a secondary cell group provided by a secondary node co-operating with a master node for providing dual-connectivity communication resources for a user equipment, wherein the activation is either the secondary node initiated or the master node initiated, wherein when the activation is initiated by the secondary node, forming a request to activate the secondary cell group;

sending the request on a data radio bearer to the master node to be delivered to the user equipment for activation of the secondary cell group; and receiving from the user equipment an activation indication; and wherein when the activation is initiated by the master node, receiving at least one message from the user equipment or from the master node; and determining initiation of the activation of the secondary cell group provided by the secondary node based on the received at least one message.

According to a fifth aspect there is provided an apparatus comprising:

means for receiving at least one packet over one or more data radio bearers from a master cell group;

means for determining whether to activate a secondary cell group based on the received at least one packet; and means for activating the secondary cell group and sending an indication for activation of the secondary cell group to a secondary node based on the determining.

According to a sixth aspect there is provided a method comprising:

receiving by a user equipment at least one packet over one or more data radio bearers from a master cell group;

determining by the user equipment whether to activate a secondary cell group based on the received at least one packet; and activating the secondary cell group and sending by the user equipment an indication for activation of the secondary cell group to a secondary node based on the determining.

According to a seventh aspect there is provided an apparatus comprising at least one processor; and at least one memory including computer program code the at least one memory and the computer program code configured to, with the at least one processor, cause the apparatus to perform at least the following:

receiving at least one packet over one or more data radio bearers from a master cell group;

determining whether to activate a secondary cell group based on the received at least one packet; and activating the secondary cell group and sending an indication for activation of the secondary cell group to a secondary node based on the determining.

According to an eighth aspect there is provided a computer program comprising computer readable program code which, when executed by at least one processor; cause an apparatus to perform at least the following:

receiving at least one packet over one or more data radio bearers from a master cell group;

determining whether to activate a secondary cell group based on the received at least one packet; and activating the secondary cell group and sending an indication for activation of the secondary cell group to a secondary node based on the determining.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

It should be noted here that in this specification, the term 'base station' refers to a logical element containing logical communication system layers (e.g. L1, L2, L3). The base stations of different RATs may be implemented in the same hardware or at separate hardware. It should also be mentioned that although the expressions "each base station" and "each mobile station" or "each user equipment" may be used, these terms need not mean every existing base station, mobile station or user equipment but base stations, mobile stations or user equipment in a certain area or set. For example, each base station may mean all base stations within a certain geographical area or all base stations of an operator of a wireless communication network or a sub-set of base stations of an operator of a wireless communication network.

Figure 1:
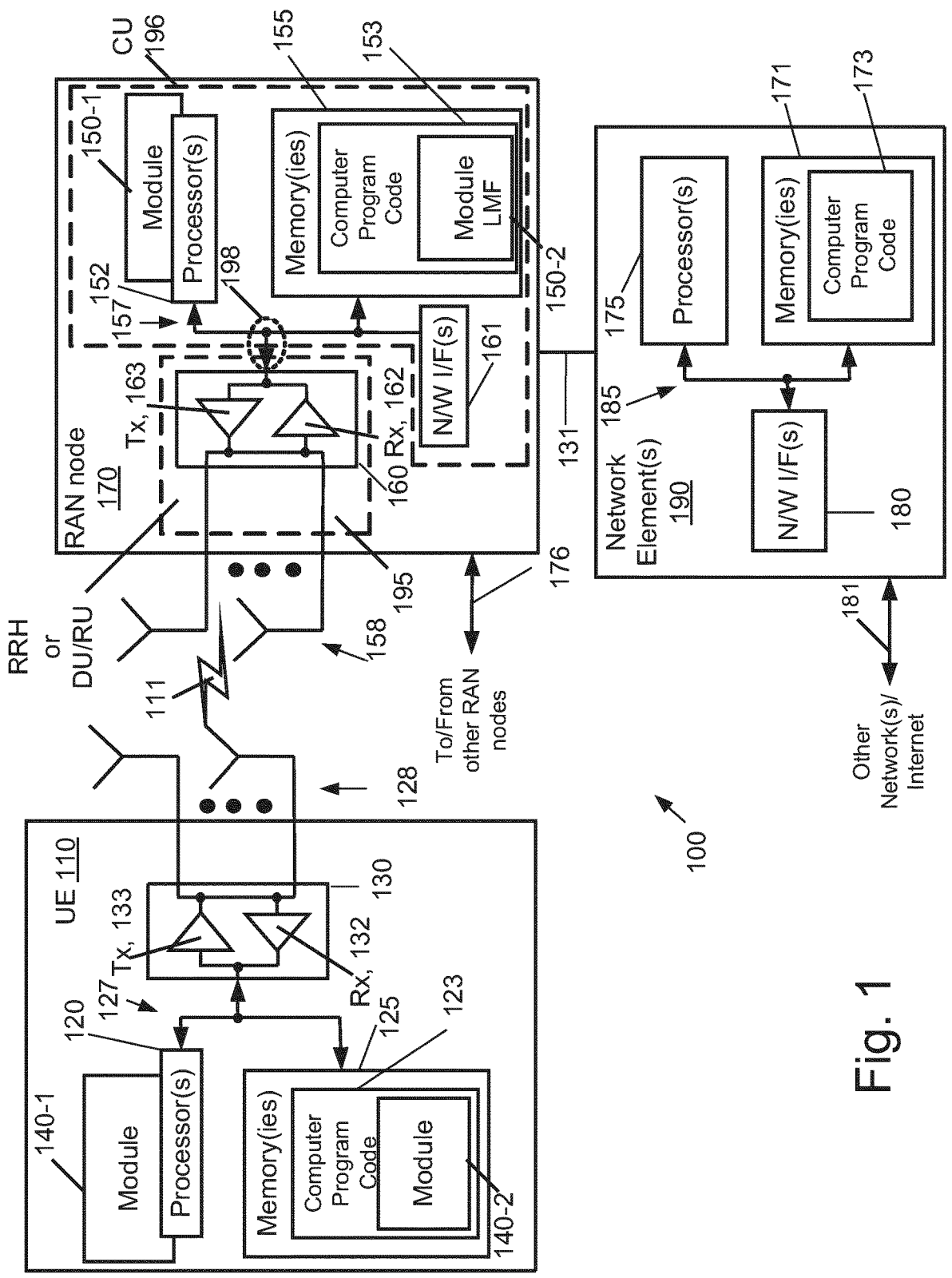
FIG. 1 shows a block diagram of one possible and non-limiting example in which the examples may be practiced.

FIG. 1 shows a block diagram of one possible and non-limiting example in which the examples may be practiced. A user equipment (UE) 110, radio access network (RAN) node 170, and network element(s) 190 are illustrated. In the example of FIG. 1, the user equipment 110 is in wireless communication with a wireless network 100. A user equipment is a wireless device that can access the wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fibre optics or other optical communication equipment, and the like. The one or more transceivers 130 are connected to one or more antennas 128. The one or more memories 125 include computer program code 123. The user equipment 110 includes a module 140, which may be implemented in a number of ways. The module 140 may be implemented in hardware as module 140-1, such as being implemented as part of the one or more processors 120. The module 140-1 may also be implemented as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The user equipment 110 communicates with RAN node 170 via a wireless link 111. The modules 140-1 and 140-2 may be configured to implement the functionality of the user equipment as described herein.

The RAN node 170 in this example is a base station that provides access by wireless devices such as the user equipment 110 to the wireless network 100. Thus, the RAN node 170 (and the base station) may also be called as an access point of a wireless communication network). The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE and connected via the NG interface to a 5GC (such as, for example, the network element(s) 190). The ng-eNB is a node providing E-UTRA user plane and control plane protocol terminations towards the UE and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), service data adaptation protocol (SDAP) and packet data convergence protocol (PDCP) of the gNB or RRC and PDCP protocols of the en-gNB that controls the operation of one or more gNB-DUs. The SDAP sub-layer is above the PDCP sublayer in 5GNR and the PDCP is the first sublayer in the 3GPP protocol stack that receives/transmits network layer traffic (TCP/IP traffic). The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may also be implemented as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers.

So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs) and processors based on multi-core processor architecture, as non-limiting examples.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Module 150-1 and/or module 150-2 may implement the functionalities and signaling of the gNB or radio node as herein described. Computer program code 173 may implement the functionalities and signaling of the AMF or network element as herein described.

The embodiments are not, however, restricted to the system given as an example but a person skilled in the art may apply the solution to other communication systems provided with necessary properties.

Figure 6:
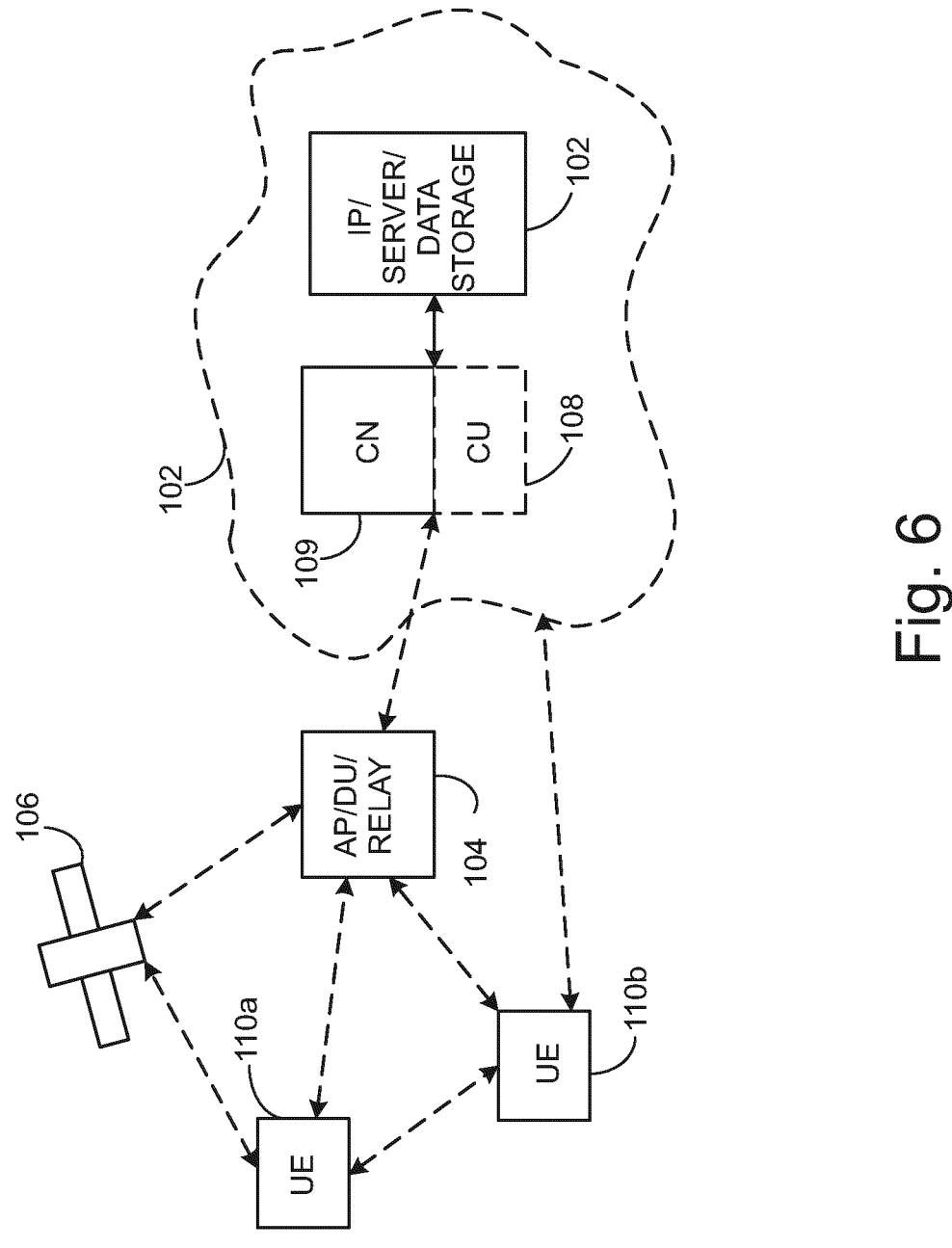
FIG. 6 shows a part of an exemplifying wireless communications access network in accordance with at least some embodiments.

The example of FIG. 6 shows a part of an exemplifying radio access network.

FIG. 6 shows user equipments 110a and 110b configured to be in a wireless connection on one or more communication channels in a cell with an access node (such as (e/g) NodeB) 104 providing the cell. The physical link from a user equipment to a (e/g)NodeB is called uplink (UL) or reverse link and the physical link from the (e/g)NodeB to the user equipment is called downlink (DL) or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user equipments. The antenna unit may comprise a plurality of antennas or antenna elements. The (e/g)NodeB is further connected to core network 109 (CN or next generation core NGC). Depending on the system, the counterpart on the CN side can be a serving gateway (S-GW, routing and forwarding user data packets), packet data network gateway (P-GW), for providing connectivity of user equipments (UEs) to external packet data networks, or mobile management entity (MME), etc. The CN may comprise network entities or nodes that may be referred to as management entities. Examples of the network entities comprise at least an Access management Function (AMF).

The user equipment (also called a user device, a user terminal, a terminal device, a wireless device, a mobile station (MS) etc.) illustrates one type of an apparatus to which resources on the air interface are allocated and assigned, and thus any feature described herein with a user equipment may be implemented with a corresponding network apparatus, such as a relay node, an eNB, and an gNB. An example of such a relay node is a layer 3 relay (self-backhauling relay) towards the base station.

The user equipment typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user equipment may also be a nearly exclusive uplink only device, of which an example is a camera or video camera loading images or video clips to a network. A user equipment may also be a device having capability to operate in Internet of Things (IoT) network which is a scenario in which objects are provided with the ability to transfer data over a network without requiring human-to-human or human-to-computer interaction. The user equipment may also utilize cloud. In some applications, a user equipment may comprise a small portable device with radio parts (such as a watch, earphones or eyeglasses) and the computation is carried out in the cloud. The user equipment (or in some embodiments a layer 3 relay node) is configured to perform one or more of user equipment functionalities. The user equipment may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 6) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available.

5G mobile communications support a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 102, or utilize services provided by them. The communication network may also be able to support the usage of cloud services, for example at least part of core network operations may be carried out as a cloud service (this is depicted in FIG. 6 by "cloud" 102). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user equipment may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-femto- or picocells. The (e/g)NodeBs of FIG. 6 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 6). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA_PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states is controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

In the following some terms will be shortly described.

A master node (MN) in MR-DC is the radio access node that provides the control plane connection to the core network. It may be a Master eNB (in EN-DC), a Master ng-eNB (in NGEN-DC) or a Master gNB (in NR-DC and NE-DC). A Master Cell Group (MCG) is in MR-DC a group of serving cells associated with the master node comprising a primary cell (PCell) of the master cell group and may also comprise one or more secondary cells (SCells). An MCG bearer is in MR-DC a radio bearer with an RLC bearer (or two RLC bearers, in case of CA packet duplication in an E-UTRAN cell group, or up to four RLC bearers in case of CA packet duplication in a NR cell group) only in the MCG.

A secondary cell group (SCG) in MR-DC is a group of serving cells associated with the secondary node comprising a primary cell (SpCell) of the secondary cell group and may also comprise one or more secondary cells (SCells). A secondary node in MR-DC is the radio access node that does not provide to the UE control plane connection to the core network, providing additional resources to the UE. It may be an en-gNB (in EN-DC), a Secondary ng-eNB (in NE-DC) or a Secondary gNB (in NR-DC and NGEN-DC).

SCG bearer in MR-DC is a radio bearer with an RLC bearer (or two RLC bearers, in case of CA packet duplication in an E-UTRAN cell group, or up to four RLC bearers in case of CA packet duplication in a NR cell group) only in the SCG.

An RLC bearer is an RLC and MAC logical channel configuration of a radio bearer in one cell group.

A split bearer in MR-DC means a radio bearer with RLC bearers both in the master cell group and in the secondary cell group. A split PDU (protocol data unit) session is a PDU Session whose quality-of-service (QoS) flows are served by more than one SDAP entities in the NG-RAN. A split signaling radio bearer (SRB) in MR-DC is a signaling radio bearer between the master node and the UE with RLC bearers both in MCG and SCG.

Signaling radio bearers are used for the transmission of RRC and NAS messages.

Some example multi-radio dual connectivity (MR-DC) configurations include E-UTRA-NR Dual Connectivity (EN-DC), New Radio Dual Connectivity (NR-DC), NG-RAN-E-UTRA Dual Connectivity (NGEN-DC) and NR-E-UTRA Dual Connectivity (NE-DC).

In EUTRA-NR Dual Connectivity (EN-DC), the LTE network works as a master network and the NR network works as a secondary cell. In this configuration, a UE will be connected to the LTE network first and then the UE will be connected to the NR via an RRC Connection Reconfiguration process.

Figure 2:
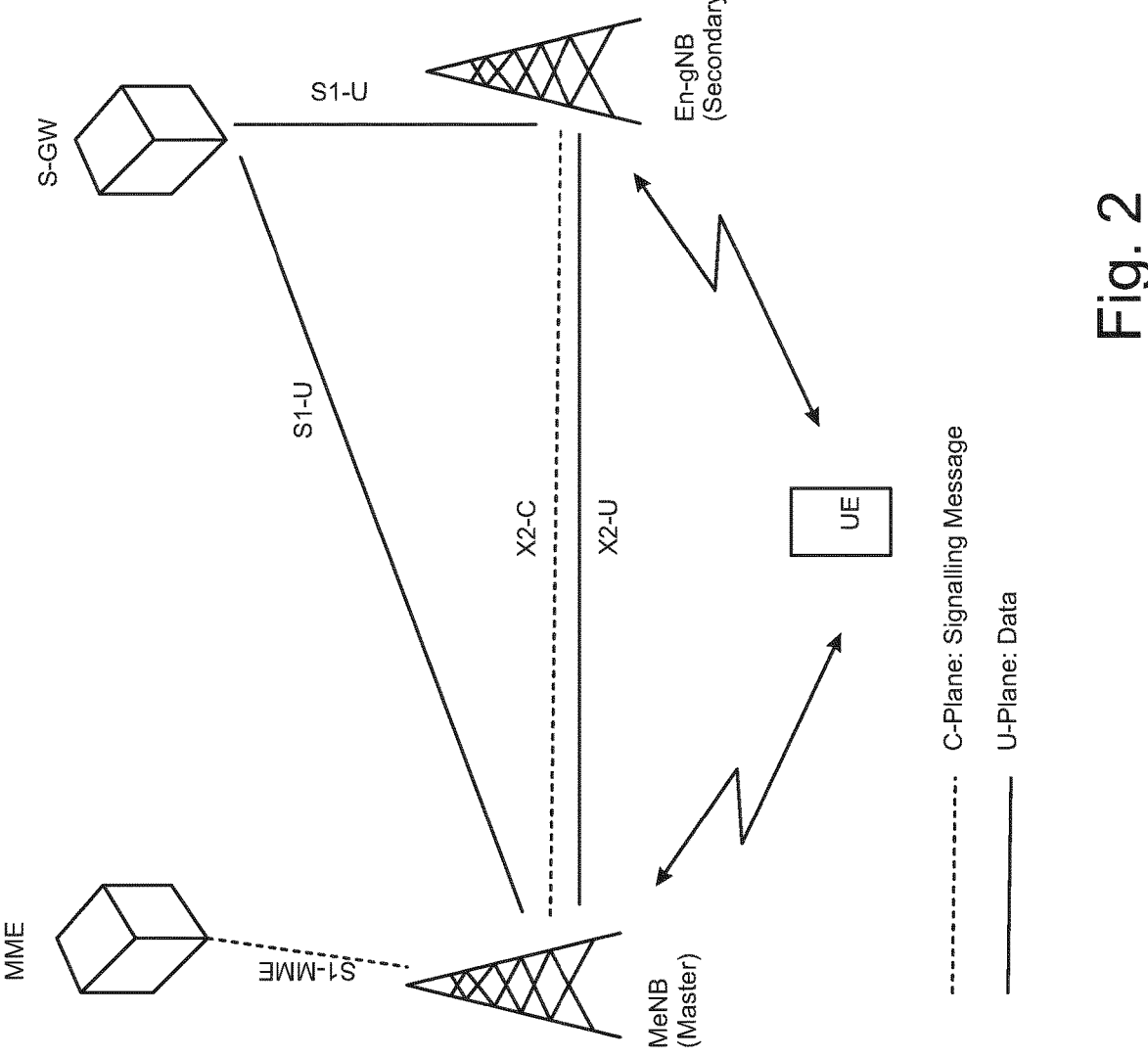
FIG. 2 illustrates an example of an overall RAN architecture of EN-DC.

Overall RAN architecture of EN-DC is illustrated in FIG. 2. The UE is communicating with both LTE eNB and NR gNB in the radio side but signaling and data are going through LTE core network. In case of data plane both the master node at the LTE side and the secondary node at the gNB side can directly interface with the LTE core network (S-GW). However, but only the master node has a direct interface with the LTE core network (MME) at the control plane.

For the control plane there is an interface between the master node and the secondary node. This interface is called X2-C. There is also an interface called S1-MME between the master node and the core network, which is the MME in this case, but there is no direct interface between the secondary node and the control node.

For the user plane there is an interface, called as X2-U, between the master node and the secondary node, and also an interface called as S1-U between the master node and the control node. Furthermore, there is an interface, which is also called as S1-U, between the secondary node and the control node.

Figures 3A, 3B, 3C:
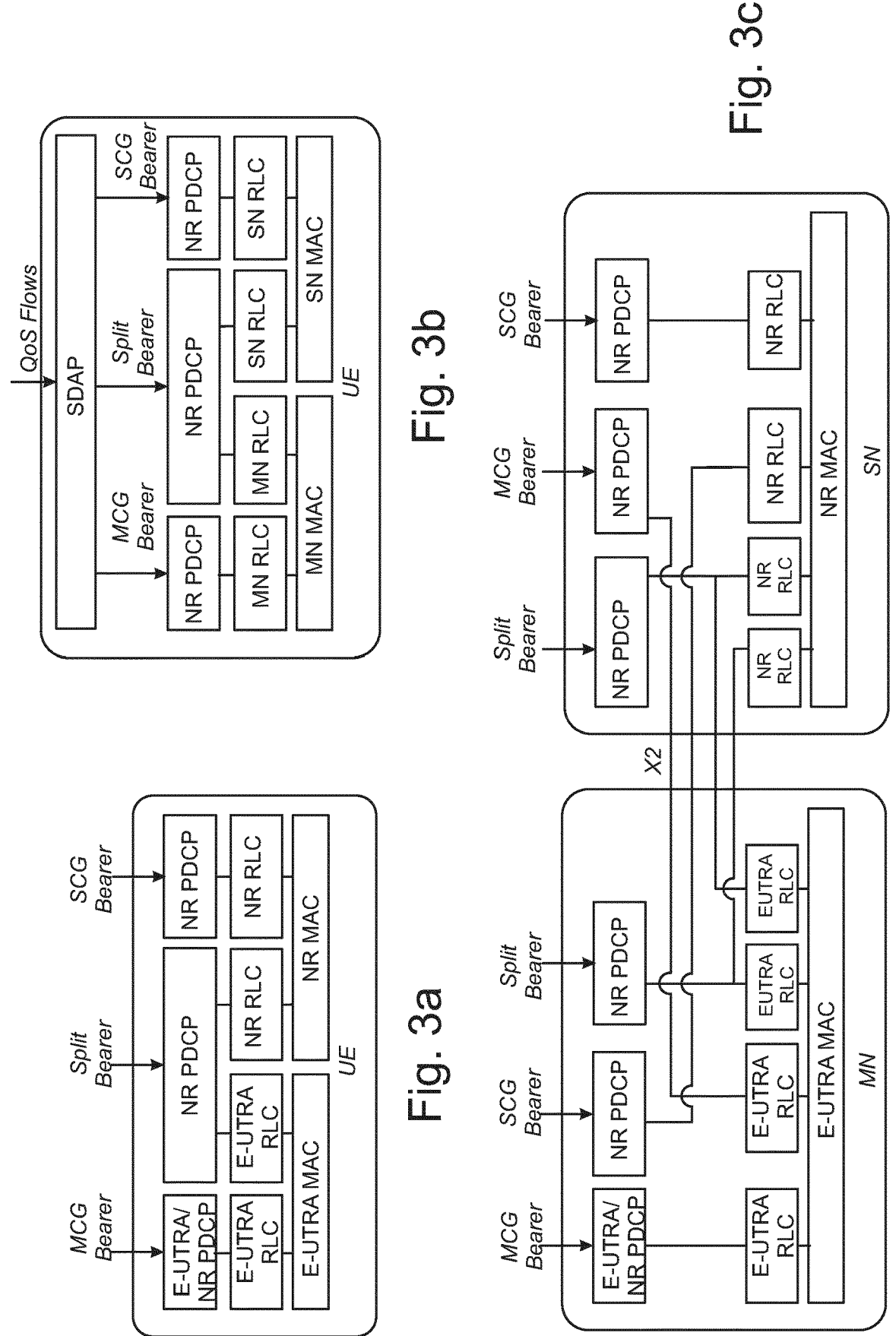
FIG. 3a illustrates an example of a radio protocol architecture for MCG, SCG and split bearers from a UE perspective in MR-DC with EPC (EN-DC)
FIG. 3b illustrates an example of a radio protocol architecture for MCG, SCG and split bearers from a UE perspective in MR-DC with 5GC (NGEN-DC, NE-DC and NR-DC)
FIG. 3c illustrates an example of a network side protocol termination options for MCG, SCG and split bearers in MR-DC with EPC (EN-DC)

In MR-DC three bearer types exist from the UE perspective, namely an MCG bearer, an SCG bearer and a split bearer. These three bearer types are depicted in FIG. 3a for the MR-DC with EPC (EN-DC) and in FIG. 3b for the MR-DC with 5GC (NGEN-DC, NE-DC and NR-DC). From a network perspective, each of these three bearers can be terminated either in the master node or in the secondary node. Network side protocol termination options are shown in FIG. 3c for MR-DC with EPC (EN-DC) and FIG. 3d illustrates an example of network side protocol termination options for MCG, SCG and split bearers in MR-DC with 5GC (NGEN-DC, NE-DC and NR-DC).

In the network side protocol termination options for MR-DC with EPC of FIG. 3c the master node MN may include information elements associated with Evolved Universal Terrestrial Radio Access and/or with New Radio, such as a Packet Data Convergence Protocol (E-UTRA/NR PDCP), Radio Link Control (E-UTRA RLC) and medium access control (E-UTRA MAC). The secondary node SN may include information elements associated with New Radio, such as a Packet Data Convergence Protocol (NR PDCP), Radio Link Control (NR RLC) and medium access control (NR MAC).

Figure 3D:
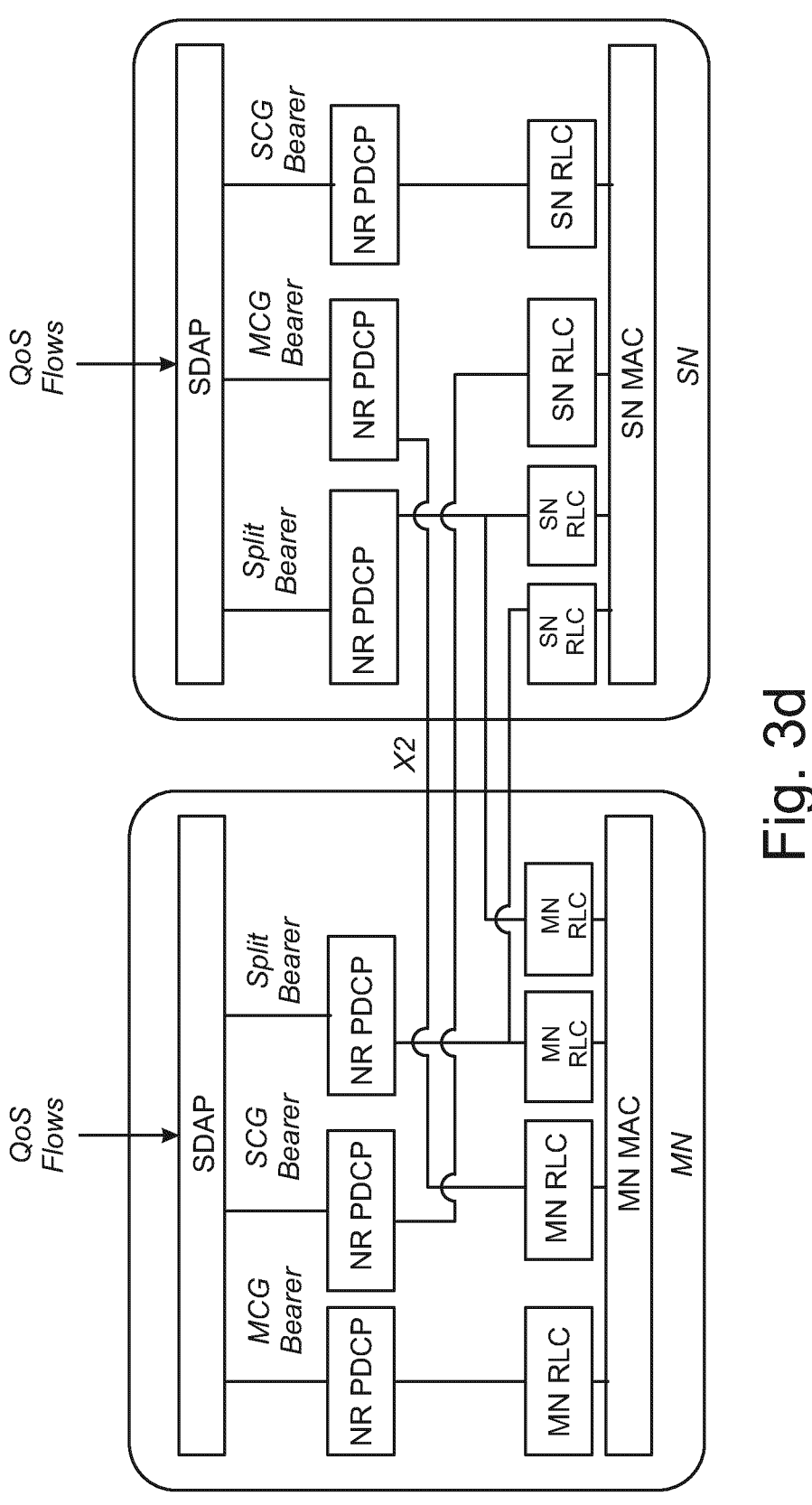
FIG. 3d illustrates an example of a network side protocol termination options for MCG, SCG and split bearers in MR-DC with 5GC (NGEN-DC, NE-DC and NR-DC)

In the network side protocol termination options for MR-DC with 5GC of FIG. 3d the master node MN may include information elements associated with New Radio, such as a Service Data Adaptation Protocol (SDAP), a Packet Data Convergence Protocol (NR PDCP), Radio Link Control (MN RLC) and medium access control (MN MAC). The secondary node SN may include information elements associated with New Radio, such as a Packet Data Convergence Protocol (NR PDCP), Radio Link Control (SN RLC) and medium access control (SN MAC).

According to 3GPP TS 37.340 version 15.3.0 Release 15, in EN-DC, for each radio bearer the MN decides the location of the PDCP entity and in which cell group(s) radio resources are to be configured, and in MR-DC with 5GC, the following principles apply: The MN decides per PDU session the location of the SDAP entity, i.e. whether it shall be hosted by the MN or the SN or by both; If the MN decides to host an SDAP entity it may decide some of the related QoS flows to be realized as MCG bearer, some as SCG bearer, and others to be realized as split bearer; If the MN decides that an SDAP entity shall be hosted in the SN, some of the related QoS flows may be realized as SCG bearer, some as MCG bearer, while others may be realized as split bearer. The SN may remove or add SCG resources for the respective QoS flows, as long as the QoS for the respective QoS flow is guaranteed.

The Packet Data Convergence Protocol (PDCP) layer processes Radio Resource Control (RRC) messages in the control plane and Internet Protocol (IP) packets in the user plane. Depending on the data radio bearer (DRB), the PDCP layer may perform header compression and security related operations such as integrity protection and ciphering. For data radio bearers which are configured to use the PDCP layer, there is one PDCP entity per data radio bearer.

Some functions of the Radio Link Control (RLC) layer are segmentation and reassembly of upper layer packets in order to adapt them to the size which can actually be transmitted over the radio interface. For data radio bearers which need error-free transmission, the RLC layer also performs retransmission to recover from packet losses. There is one RLC entity per data radio bearer.

In the Medium Access Control (MAC) layer multiplexing of data from different data radio bearers is performed, the MAC layer may try to achieve the negotiated Quality of Service (QoS) for each data radio bearer by deciding the amount of data that can be transmitted from each data radio bearer and instructing the RLC layer as to the size of packets to provide.

At the transmitting side, each layer receives a Service Data Unit (SDU) from a higher layer, for which the layer provides a service, and outputs a Protocol Data Unit (PDU) to the layer below. The RLC layer receives packets from the PDCP layer. These packets are called PDCP PDUs from a PDCP point of view and represent RLC SDUs from an RLC point of view. The RLC layer creates packets which are provided to the layer below, i.e. the MAC layer. The packets provided by RLC to the MAC layer are RLC PDUs from an RLC point of view, and MAC SDUs from a MAC point of view. At the receiving side, the process is reversed, with each layer passing SDUs up to the layer above, where they are received as PDUs.

In the following, some example embodiments regarding enablement of a relatively fast activation of secondary cell groups for a user equipment are described. The activation of secondary cell groups may be initiated by a secondary node (SN-initiated SCG activation) or by a master node (MN-initiated SCG activation). The secondary cell group may provide communication resources for a user equipment in addition to communication resources which may have already been activated for the user equipment e.g. by the master node or by both the master node and the secondary node. A secondary node addition procedure may have been performed earlier by the MN to establish a UE context at the SN to provide resources from the SN to the UE. The existing SCG may then be activated by an activation procedure to be described in the following, in accordance with some embodiments of the disclosure.

Figure 4:
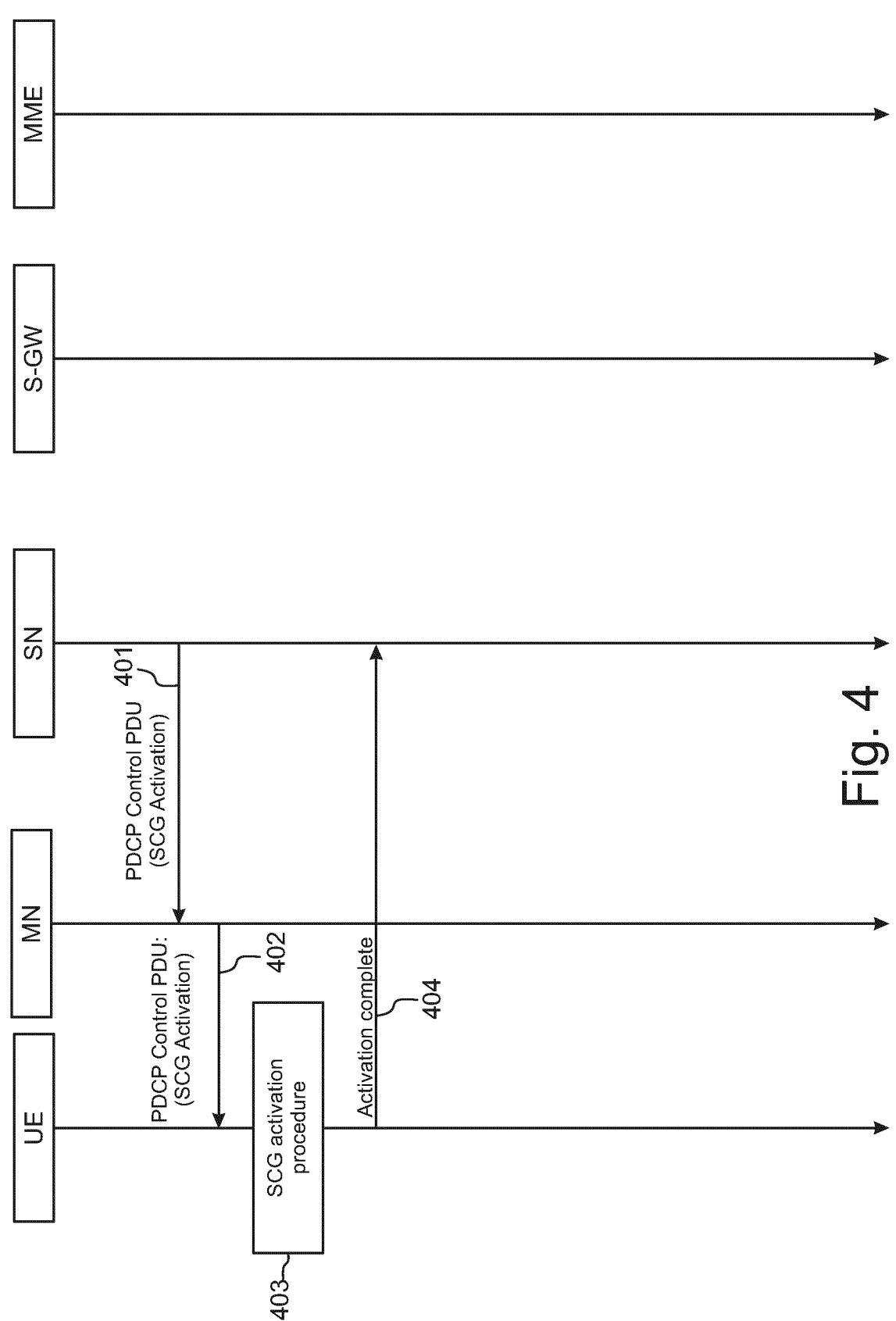
FIG. 4 shows a signaling diagram of operations between a user equipment, master node and secondary node, in accordance with an embodiment.

In accordance with an embodiment of the disclosure, the activation of a secondary cell group by a secondary node may be performed as follows, with reference to the signaling diagram of FIG. 4. A request for activating the secondary cell group may be formed. For example, a PDCP control protocol data unit (PDCP control PDU) is defined, wherein the secondary node of a network with which the UE is communicating sends the PDCP control PDU over a secondary node terminated data radio bearer (SN-terminated DRB) (arrow 401 in FIG. 4) to a master node which forwards 402 the PDCP control PDU over an MCG RLC to the UE. The UE receives the PDCP control PDU and the PDCP entity corresponding the bearer (split or MCG Bearer of the UE) used in the reception of the PDCP control PDU examines inter alia the type of the received PDCP control PDU (PDU type, for example 3 bits in a header of the PDCP control PDU). When the PDCP entity of the UE determines 403 that the received PDCP control PDU comprises an indication to activate the SCG, the PDCP entity provides this indication to another protocol in the protocol stack where an SCG activation procedure may be initiated. In the activation procedure the UE communicates with the SCG to be activated by using, for example, a random-access procedure. The user equipment may send 404 an acknowledgement to e.g. the secondary node to indicate that the activation procedure has been completed in the user equipment.

Similarly, also the master node MN could use the PDCP Control PDU to activate the SCG through any DRB which is associated with an MCG RLC.

In accordance with another embodiment of the disclosure, the UE is pre-configured to activate its SCG when the downlink data rate of one or more DRBs (for example split DRBs) exceeds a configured threshold. In other words, the data transmission capacity of the MCG and possibly already activated SCG(s) may not be enough for the increased data rate, wherein more transmission capacity could be provided by one or more additional activated SCGs.

In accordance with another embodiment of the disclosure, the UE is pre-configured to activate its SCG when the number of the received downlink data packets over one or more DRBs (for example split DRBs) exceeds a configured threshold.

The UE could examine data transmitted by those data radio bearers which are among those to be utilized in the SCG activation decision and when the data rate or/and the number of received data packets exceeds the configured threshold, the UE could initiate the activation of the SCG.

The one or more DRBs the UE could use to count the downlink data rate and the number of received data packets could be configured by the network explicitly. Alternatively, these DRBs could implicitly include all SN-terminated DRBs, i.e. DRBs for which RRC has configured keyToUse=secondary, and/or all split DRBs, i.e. DRBs with more than one associated RLC mapped to different cell groups.

Such triggers defined at PDCP would enable the SN to activate the UE's SCG fast, without a preceding signaling exchange with the MN.

It may even be possible that such triggers could allow introduction of SCG activation/deactivation such that it is fully controlled by the SN, and no specific support by the IN is needed.

Figure 5:
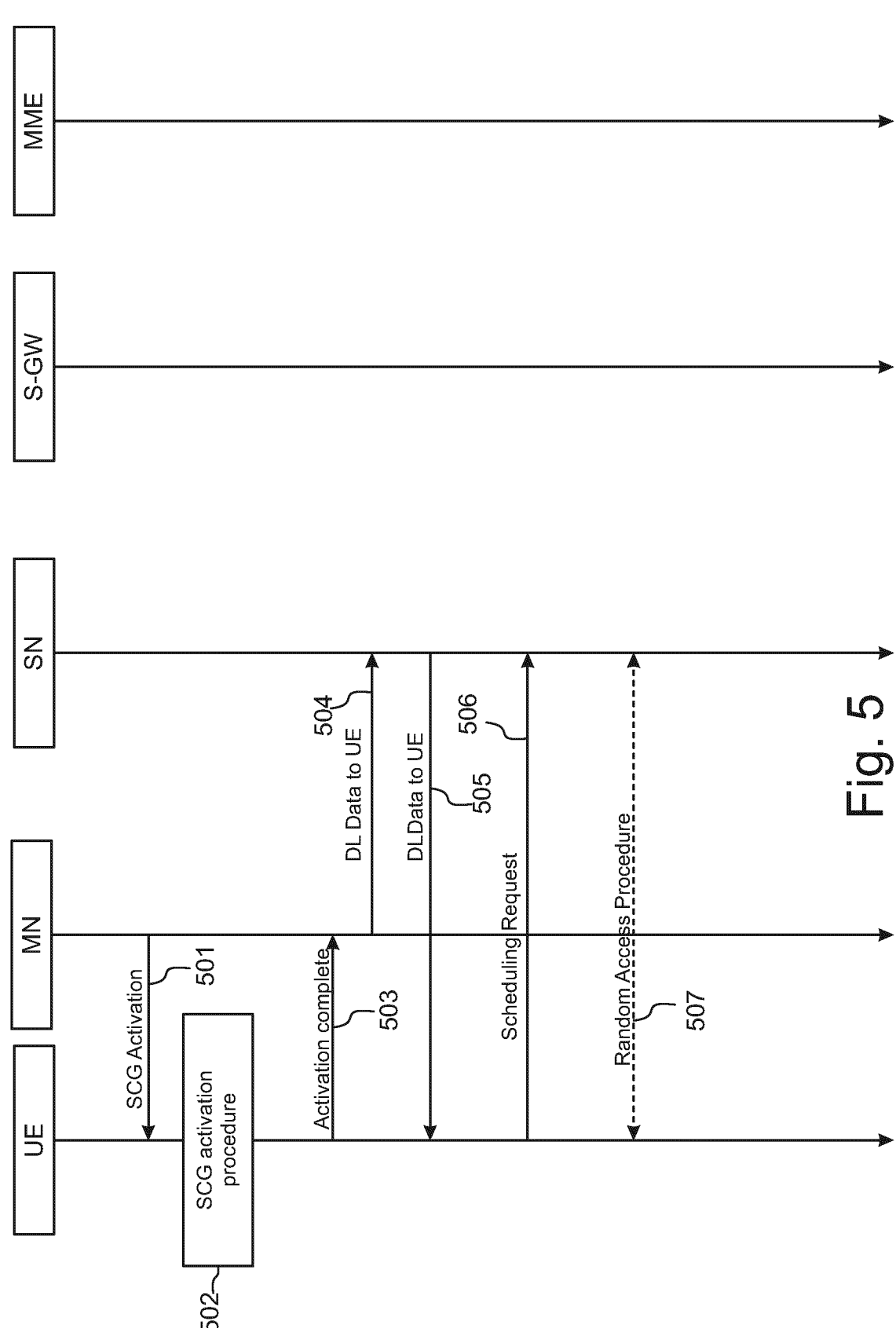
FIG. 5 shows another signaling diagram of operations between a user equipment, master node and secondary node, in accordance with an embodiment.

In the following, some embodiments are disclosed regarding the activation of secondary cell group initiated by a master node (MN-initiated SCG activation) with reference to FIG. 5.

The SCG activation in a secondary node may not need any specific signaling between MN and SN but the activation may be done implicitly based on signaling from UE or data received from a master node. In one embodiment of the present disclosure, the MN commands SCG activation to the UE without exchanging any signaling with the SN first. The activation may comprise sending a message to the UE (arrow 501 in FIG. 5) indicating that the UE should initiate the SCG activation procedure 502. After successful activation the UE may send 503 a message to the MN which informs the MN that the activation of the SCG was successful.

The SN learns about the activation of SCG implicitly, for example from downlink data received from MN, for example if the MN sends 504 downlink data to the SN to be forwarded to the UE (arrow 505). Another example how the SN may learn about the activation of SCG implicitly is that the UE contacts the SN via e.g. a scheduling request 506 or a random-access procedure 507, as commanded by the MN.

The MN-initiated SCG activation could be conducted using RRC signaling, using a PDCP Control PDU as was described above for the SN initiated SCG activation, or via a media access control element (IAC CE).

There can be some aspects about the UE's SCG configuration that may prohibit the use of the implicit activation as such. Such aspects include, for instance, configured uplink-scheduling grants and scheduling request resources, which the UE MAC assumes to occur at instants preconfigured by RRC. If the MN activates such a configuration at the UE without the SN knowing, the UE's transmissions are likely to collide with another UE scheduled by the SN or not even decoded by the SN. To take this into consideration, an activation pre-authorization of MN by SN may be implemented, where the SN indicates to MN that the MN is (or is not) allowed to activate the UE's SCG without any prior signaling indication to the SN. For example, the SN sends control information to the MN through the Xn or X2 interface between the SN and MN to indicate the MN that the MN is not allowed to activate the UE's SCG without any prior signaling indication by the MN to the SN. Hence, if a situation occurs that the MN should activate the SCG for the UE, the MN initiates a signaling exchange with the SN to inform the SN that the SCG should be activated for the UE. If the SN accepts the request, the SN informs the MN, e.g. by sending corresponding control information to the MN through the Xn or X2 interface, that the MN is now authorized to activate the SCG for the UE. Then, the MN may use the RRC signaling, the PDCP Control PDU, or via the media access control element (MAC CE) as was described above to inform the UE about the activation of the SCG and the UE initiates the SCG activation procedure described above.

Alternatively, in one embodiment of the disclosure, such configured uplink resources remain suspended until granted by the SN, e.g., through explicit signaling or implicitly based on received signaling from SN. For instance, upon Random Access procedure completion (after successful contention resolution), or upon PDCCH reception from SN (e.g., to schedule a DL assignment or UL grant) the UE could resume the suspended uplink configurations.

Additionally or alternatively, in one embodiment, the MN-initiated SCG activation comes always with Random Access procedure initiation at the UE regardless of if a Time Alignment Timer is running to sync up SN about the SCG activation by the MN.

The above described authorization indication by the SN could be carried, for example, in XnAP (TS 38.423) messages like S-Node Addition Request Acknowledge, S-Node Modification Request Acknowledge, and S-Node Modification Required, or the X2AP (36.423) counterparts in case of EN-DC.

The above described embodiments of the disclosure may allow fast activation of a UE's secondary cell group, either by the MN or the SN, without a preceding signaling exchange with the SN or MN, respectively. As an extreme option, it may allow introducing the feature of SCG activation/deactivation without any impact on MN.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the disclosure operating within a wireless device or a gNB, it would be appreciated that the disclosure as described above may be implemented as a part of any apparatus comprising a circuitry in which radio frequency signals are transmitted and/or received. Thus, for example, embodiments of the disclosure may be implemented in a mobile phone, in a base station, in a computer such as a desktop computer or a tablet computer comprising radio frequency communication means (e.g. wireless local area network, cellular radio, etc.).

In general, the various embodiments of the disclosure may be implemented in hardware or special purpose circuits or any combination thereof. While various aspects of the disclosure may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the disclosures may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analogue and/or digital circuitry) and (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In the following, a list of acronyms used in this specification are provided:

3GPP—$3^{rd}$ Generation Partnership Project

4G-LTE—Long Term Evolution

5G—5th Generation eNB—Evolved NodeB gNB—5G/NR Base Station

BS Base station

CN—Core Network

CU—Central Unit

DL—Downlink

DRB—Data radio bearer

DSP—Digital Signal Processor

DU—Distributed Unit
FPGA—Field-programmable gate array
MIMO—Multiple Input-Multiple Output
MS—Mobile Station
NR—New Radio
PDA—Personal Digital Assistant
PDSCH—Physical Downlink Shared Channel
RAN—Radio Access Network
RRC—Radio Resource Control
TRP—Transmission Reception Point
UE—User Equipment
UL—Uplink
UMTS—Universal Mobile Telecommunications System
UTRAN—UMTS Radio Access Network In the following some numbered examples of the disclosure will be provided.

1. A network element comprising:

means for activating a secondary cell group provided by a secondary node co-operating with a master node for providing dual-connectivity communication resources for a user equipment, wherein the activation is either the secondary node initiated or the master node initiated, wherein when the activation is initiated by the secondary node, the network element comprising:

means for forming a request to activate the secondary cell group;

means for sending the request on a data radio bearer to the master node to be delivered to the user equipment for activation of the secondary cell group; and means for receiving from the user equipment an activation indication; and wherein when the activation is initiated by the master node, the network element comprising:

means for receiving at least one message from the user equipment or from the master node; and means for determining initiation of the activation of the secondary cell group provided by the secondary node based on the received at least one message.

2. The network element according to the example 1, wherein the network element comprising means for sending the request to the master node as a packet data convergence protocol control message over the data radio bearer associated with a master cell group radio link control protocol.

3. The network element according to any of the examples 1 to 2, wherein the received at least one message comprises one or more of the following:

a scheduling request from the user equipment;

a message from the user equipment related to a random-access procedure with the network element; and downlink data to be transmitted to the user equipment.

4. The network element according to any of the examples 1 to 3 comprising: means for indicating to the master node whether the activation of the secondary cell group is allowed without any prior signaling indication to the secondary node.

5. A method comprising:

activating a secondary cell group provided by a secondary node co-operating with a master node for providing dual-connectivity communication resources for a user equipment, wherein the activation is initiated either by the secondary node or the master node:

wherein when the activation is initiated by the secondary node, forming a request to activate the secondary cell group;

sending the request on a data radio bearer to the master node to be delivered to the user equipment for activation of the secondary cell group; and receiving from the user equipment an activation indication; and wherein when the activation is initiated by the master node, receiving at least one message from the user equipment or from the master node;

determining initiation of the activation of the secondary cell group provided by the secondary node based on the received at least one message.

6. The method according to the example 5 further comprising:

sending by the secondary node the request to the master node as a packet data convergence protocol control message over the data radio bearer associated with a master cell group radio link control protocol.

7. The method according to any of the examples 5 to 6, wherein said received at least one message comprises one or more of the following:

a scheduling request;

a message from the user equipment related to a random-access procedure with the secondary node; and downlink data to be transmitted to the user equipment.

8. The method according to any of the examples 5 to 7 comprising:

indicating to the master node whether the activation of the secondary cell group is allowed without any prior signaling indication to the secondary node.

9. An apparatus comprising at least one processor; and at least one memory including computer program code the at least one memory and the computer program code configured to, with the at least one processor, cause the apparatus to perform at least the following:

activating a secondary cell group provided by a secondary node co-operating with a master node for providing dual-connectivity communication resources for a user equipment, wherein the activation is initiated either by the secondary node or the master node, wherein when the activation is initiated by the secondary node:

forming a request to activate the secondary cell group;

sending the request on a data radio bearer to the master node to be delivered to the user equipment for activation of the secondary cell group; and receive from the user equipment an activation indication;

wherein when the activation is initiated by the master node, receiving at least one message from the user equipment or from the master node; and determining initiation of the activation of the secondary cell group provided by the secondary node based on the received at least one message.

10. A user equipment comprising:

means for receiving at least one packet over one or more data radio bearers from a master cell group;

means for determining whether to activate a secondary cell group based on the received at least one packet; and means for activating the secondary cell group and sending an indication for activation of the secondary cell group to a secondary node based on the determining.

11. The user equipment according to the example 10, said means for determining comprising:

means for examining whether at least one of the received packet comprises indication of a request to activate the secondary cell group.

12. The user equipment according to any of the examples 10 to 11, said means for determining comprising:

means for comparing the received at least one packet over the one or more data radio bearers with a threshold, wherein the one or more data radio bearers are predefined.

13. The user equipment according to example 12, wherein the threshold comprises at least one of:

a data rate; and a number of packets.

14. The user equipment according to the example 12 or 13, said the one or more predefined data radio bearers comprising one or more of:

secondary node terminated data radio bearers; and split data radio bearers.

15. The user equipment according to any of the examples 10 to 14, comprising means for sending, based on the determining, at least one of the following to indicate activation of the secondary cell group:

a scheduling request to the secondary node;

a message related to a random-access procedure with the secondary node.

16. The user equipment according to any of the examples 10 to 15 further comprising:

means for receiving an indication to resume suspended configured uplink resources associated with the activated secondary cell group; and means for resuming the suspended configured uplink resources associated with the activated secondary cell group.

17. The user equipment according to example 16, wherein the indication to resume the configured uplink resources associated with the activated secondary cell group comprises at least one of:

a successful contention resolution during a random-access procedure with the secondary node; and a physical downlink control channel, PDCCH, transmission addressed to cell radio network temporary identifier, C-RNTI, from the secondary node.

18. A secondary node of a communication network comprising at least one processor; and at least one memory including computer program code;

the at least one memory and the computer program code configured to, with the at least one processor, cause the secondary node to perform at least the following:

activating a secondary cell group provided by the secondary node co-operating with a master node for providing dual-connectivity communication resources for a user equipment, wherein the activation is either the secondary node initiated or the master node initiated, the secondary node initiated activation comprising computer program code configured to, with the at least one processor, cause the secondary node to perform at least the following:

forming a request to activate the secondary cell group;

sending the request on a data radio bearer to the master node to be delivered to the user equipment for activation of the secondary cell group; and receiving from the user equipment an activation indication; and the master node initiated activation comprising computer program code configured to, with the at least one processor, cause the secondary node to perform at least the following:

receiving at least one message from the user equipment or from the master node; and determining initiation of the activation of the secondary cell group provided by the secondary node based on the received at least one message.

19. A master node of a communication network comprising:

at least one processor; and at least one memory including computer program code;

the at least one memory and the computer program code configured to, with the at least one processor, cause the master node to perform at least the following:

activating a secondary cell group provided by a secondary node co-operating with the master node for providing dual-connectivity communication resources for a user equipment, wherein the activation is either the secondary node initiated or the master node initiated;

the secondary node initiated activation comprising computer program code configured to, with the at least one processor, cause the master node to perform at least the following:

receiving a request as a packet data convergence protocol control message on a data radio bearer from the secondary node to activate the secondary cell group; and sending the request to the user equipment for activation of the secondary cell group;

the master node initiated activation comprising computer program code configured to, with the at least one processor, cause the master node to perform at least the following:

sending a request to the user equipment for activation of the secondary cell group.

20. The master node according to the example 19, said at least one memory comprising computer program code configured to, with the at least one processor, cause the master node to perform at least the following:

receiving an indication whether the activation of the secondary cell group is not allowed without any prior signaling indication to the secondary node;

sending a request to the secondary node to activate of the secondary cell group if the activation of the secondary cell group is not allowed without any prior signaling indication to the secondary node;

receiving from the secondary node an authorization for the activation.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A user equipment comprising at least one processor; and at least one memory including computer program code;

the at least one memory and the computer program code configured to, with the at least one processor, cause the user equipment to perform at least the following:

receiving, when connected with a master node and a secondary node, at least one packet over one or more data radio bearers, via a master cell group of the master node, wherein the at least one packet is indictive of activation of a secondary cell group of the secondary node;

determining whether to activate the secondary cell group based on the received at least one packet;

activating the secondary cell group of the secondary node and sending an indication of the activation of the secondary cell group of the secondary node to the secondary node based on the determining; and comparing the received at least one packet over the one or more data radio bearers with a threshold, wherein the one or more data radio bearers are predefined.

2. The user equipment according to claim 1, said at least one memory comprising computer program code configured to, with the at least one processor, cause the user equipment to perform at least the following:

determining whether the received at least one packet comprises indication of a request to activate the secondary cell group.

3. The user equipment according to claim 1, wherein the threshold comprises at least one of:

a data rate; and a number of packets.

4. The user equipment according to claim 1, said at least one memory comprising computer program code configured to, with the at least one processor, cause the user equipment to send, based on the determining whether to activate a secondary cell group based on the received at least one packet, at least one of the following to indicate activation of the secondary cell group:

a scheduling request to the secondary node; and a message related to a random-access procedure with the secondary node.

5. The user equipment according to claim 1, said at least one memory comprising computer program code configured to, with the at least one processor, cause the user equipment to perform at least the following:

receiving an indication to resume suspended configured uplink resources associated with the activated secondary cell group; and resuming the suspended configured uplink resources associated with the activated secondary cell group.

6. The user equipment according to claim 5, wherein the indication to resume the configured uplink resources associated with the activated secondary cell group comprises at least one of:

a successful contention resolution during a random-access procedure with the secondary node; and a physical downlink control channel, PDCCH, transmission addressed to cell radio network temporary identifier, C-RNTI, from the secondary node.

7. The user equipment according to claim 1, wherein the received at least one packet comprises at least one of a packet data convergence protocol control message and a packet data convergence protocol data message.

8. A method comprising receiving by a user equipment connected with a master node and a secondary node, at least one packet over one or more data radio bearers, via a master cell group of the master node, wherein the at least one packet is indictive of activation of a secondary cell group of the secondary node;

determining by the user equipment whether to activate the secondary cell group based on the received at least one packet;

activating the secondary cell group of the secondary node and sending by the user equipment an indication of the activation of the secondary cell group of the secondary node to the secondary node based on the determining; and comparing the received at least one packet over the one or more data radio bearers with a threshold, wherein the one or more data radio bearers are predefined.

9. The method according to claim 8 further comprising:

determining whether the received at least one packet comprises indication of a request to activate the secondary cell group.

10. The method according to claim 8, wherein the threshold comprises at least one of:

a data rate; and a number of packets.

11. The method according to claim 8 further comprising sending, based on the determining whether to activate a secondary cell group based on the received at least one packet, at least one of the following to indicate activation of the secondary cell group:

a scheduling request to the secondary node; and a message related to a random-access procedure with the secondary node.

12. The method according to claim 8 further comprising receiving an indication to resume suspended configured uplink resources associated with the activated secondary cell group; and resuming the suspended configured uplink resources associated with the activated secondary cell group.

13. The method according to claim 12, wherein the indication to resume the configured uplink resources associated with the activated secondary cell group comprises at least one of:

a successful contention resolution during a random-access procedure with the secondary node; and a physical downlink control channel, PDCCH, transmission addressed to cell radio network temporary identifier, C-RNTI, from the secondary node.

14. The method according to claim 8, wherein the received at least one packet comprises at least one of a packet data convergence protocol control message and a packet data convergence protocol data message.

* * * * *